UNITED STATES PATENT OFFICE.

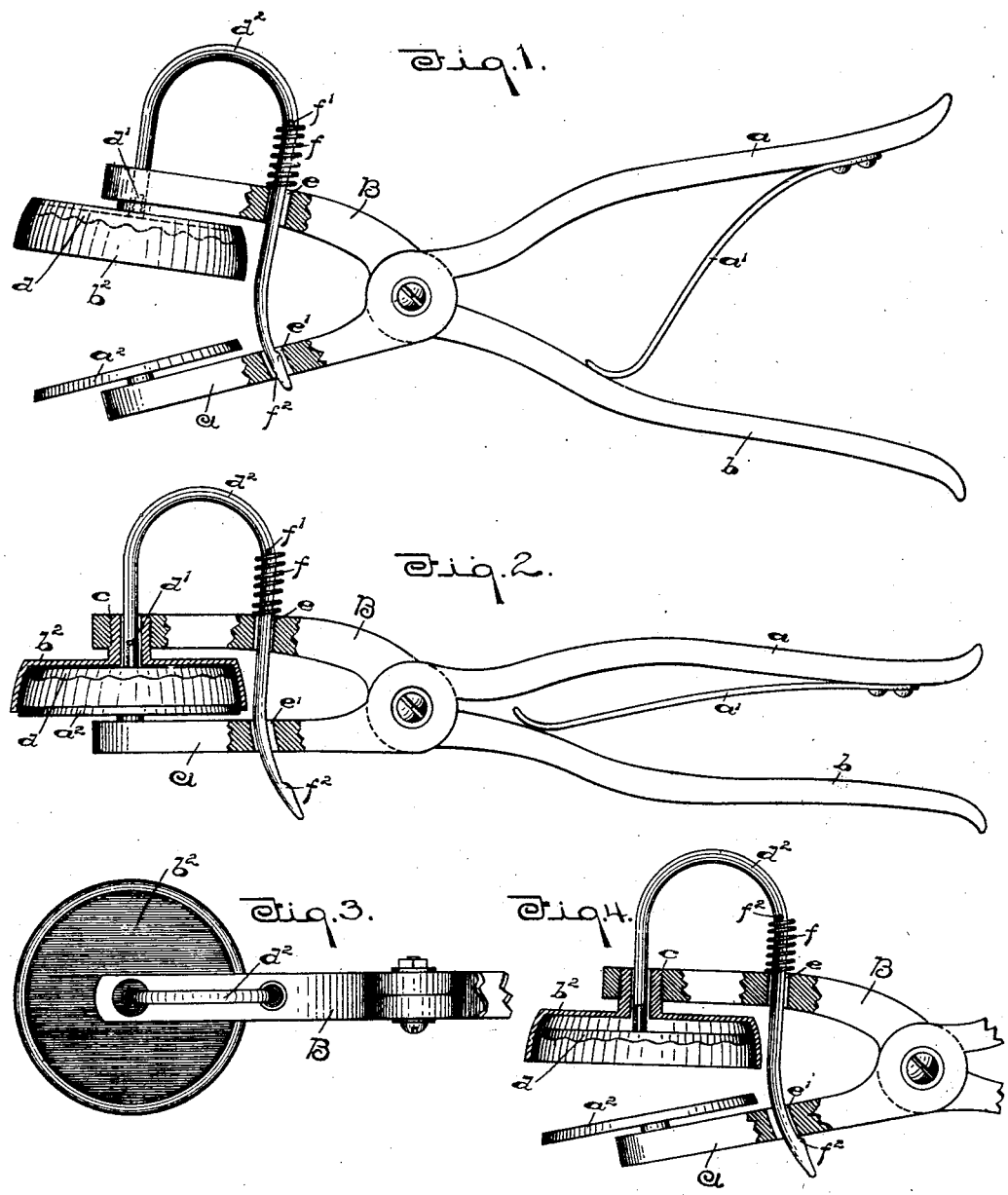

FREDERICK ADOLPH WEGNER, OF MADISON, WISCONSIN.

BUTTER-MOLD.

SPECIFICATION forming part of Letters Patent No. 710,546, dated October 7, 1902.

Application filed October 17, 1901. Serial No. 78,968. (No model.)

*To all whom it may concern:*

Be it known that I, FREDERICK ADOLPH WEGNER, a citizen of the United States, residing at Madison, in the county of Dane and State of Wisconsin, have invented certain new and useful Improvements in Butter-Molds; and I do hereby declare the following to be a full, clear, and exact description of the invention, such as will enable others skilled in the art to which it appertains to make and use the same.

My invention relates to butter-molds such as are used for forming butter into small cakes for individual use; and its object is to cheapen and simplify the construction, render the molding operation easy and effective, and to provide for automatically ejecting the print after the jaws of the mold have been opened, so that the print is discharged while the mold assumes the position ready to receive the next disk or cake of butter, and thus the work is greatly expedited.

With these objects in view the invention consists in the construction, combination, and arrangement of parts, as will be more fully described in the following description and finally pointed out in the claims, reference being had to the accompanying drawings, in which—

Figure 1 is a side elevation of the mold ready to receive a supply of butter. Fig. 2 is a similar view, partly in section, showing the position of the mold when the butter has been compressed therein. Fig. 3 is a top plan view of the mold, the operating-handles being broken away. Fig. 4 is a view, partly in elevation and partly in section, showing the position of the parts when the print is being ejected.

In the drawings like characters of reference indicate corresponding parts throughout the several views.

A designates one of the jaws of the mold, one end of which is formed into a handle $a$, to which is secured a spring $a'$. B designates the other jaw of the mold fulcrumed to the jaw A and provided with a handle $b$, which is normally held separated from the jaw A by the spring $a'$, the free end of which engages with the said handle $b$.

Upon the end of the jaw A is mounted a presser-block $a^2$ in the form of a disk the edges of which are slightly beveled upwardly to adapt them to conform to the interior shape of the mold $b^2$ on the end of the other jaw B. The mold $b^2$ consists of a disk-shaped receptacle for the butter and is provided with a central exteriorly-screw-threaded tubular stud $c$, which screws into the screw-threaded opening in the end of the jaw B. Within the receptacle $b^2$ is mounted a follower-block $d$, having its lower surface provided with any design and which is secured by a screw $d'$ to the arm $d^2$, which extends through the tubular stud of the mold. This arm $d^2$ is curved rearwardly and downwardly and extended through the openings $e$ and $e'$ in the jaws A and B, so that it will not interrupt the vertical movement of the jaws. Upon this arm $d^2$ is mounted a coil-spring $f$, which is confined between the top of the jaw B and the transverse pin $f'$ in the arm. The free end of the arm $d^2$ is bent rearwardly and provided with a shoulder $f^2$, which engages with the edge of the opening $e'$ in the jaw A when the jaws are distended or open to eject the print from the mold, as shown in Fig. 4.

In Fig. 1 the device is shown in position ready to receive a supply of butter, the spring $a'$ having forced the handles apart sufficiently to disengage the shoulder $f^2$ on the arm $d^2$ from the edge of the opening $e'$. After the mold $b^2$ has been filled with butter the handles are drawn together against the action of the spring $a'$, and the presser-block $a^2$ on the end of one of the jaws will be inserted within the mold $b^2$ to compress the butter and form a print, as shown in Fig. 2. This action of the jaws also slightly compresses the spring $f$, and the follower-block $d$ is tightly seated in the top of the mold. When the handles A and B are released, the spring $a'$ will force the same apart, and consequently open the jaws and release the presser-block from the mold. As the jaws continue to open the edge of the opening $e'$ will engage with the shoulder $f^2$ on the end of the arm $d^2$ and draw said arm downwardly against the tension of the coil-spring $f$, and with it the follower-block $d$, which dislodges the print from the mold. This position of the jaws is shown in Fig. 4. It will be seen that the print is not ejected until the shoulder $f^2$ is engaged by the edge of the opening $e'$ or not until the presser-block $a^2$ is separated a sufficient distance from the mold. The spring $f$ exerts an upward pressure upon the arm $d^2$ and holds the follower-block tightly in the top of the mold. By this operation the print is not ejected until the lower jaw and its presser-block has assumed the position shown in Fig. 4, whereupon the print will easily fall from the presser-block without being marred, as it otherwise would be if the ejecting operation immediately took place upon the release of the jaws. After the print has been ejected the jaws may be further expanded until the shoulder $f^2$ is disengaged from the edge of the opening $e'$, which allows the coil-spring $f$ to again expand and draw the follower-block upwardly into its normal position, as shown in Fig. 1, whereupon it is ready to receive another supply of butter.

Having thus described my invention, what I claim, and desire to secure by Letters Patent, is—

1. A butter-mold comprising pivoted jaws, a mold carried by one of the jaws, an ejector in the mold, a presser-block carried by the other jaw, and means connecting the ejector and the last-named jaw whereby the ejector is actuated by the spreading of the said jaws.

2. In a device for molding prints of butter comprising two normally separated jaws, fulcrumed at an intermediate point, a mold detachably mounted upon the end of one of said jaws, and a presser-block carried by the end of the other jaw, an arm carried by the molding-jaw, one end of which is extended through the mold to support a follower-block and the other end provided with a shoulder adapted to be engaged by the opposite jaw to eject the print from the mold, a coil-spring mounted upon the arm above the upper jaw to exert an upward pressure upon said arm and hold the follower-block tightly seated in the top of the mold, substantially as described.

3. A butter-mold comprising pivoted jaws, a mold carried by one of the jaws, an ejector in the mold, a presser-block carried by the other jaw, and means on the first-named jaw to hold the ejector against action during the molding of the print.

4. A butter-mold comprising pivoted jaws, a mold carried by one of the jaws, an ejector in the mold, means to hold the ejector against operation during the compression of the jaws and means to actuate the ejector by the spreading of the jaws.

5. A butter-mold comprising pivoted jaws, a mold carried by one of the jaws, an ejector in the mold, means actuated by a partial spreading of the jaws to eject the print, and means released by a continued spreading of the jaws to retract the ejector.

6. A butter-mold comprising pivoted jaws, a mold carried by one of the jaws, an ejector in the mold, a presser-block carried by the other jaw, and an arm connecting the ejector and the last-named jaw, whereby the spreading of the jaws actuates the ejector.

7. A butter-mold comprising pivoted jaws, a mold carried by one of the jaws, an ejector in the mold, a presser-block carried by the other jaw, an arm connecting the ejector and the last-named jaw, and means on the arm to hold the ejector seated in the mold.

8. A butter-mold comprising pivoted jaws, a mold carried by one of the jaws, an ejector in the mold, a presser-block carried by the other jaw, and an arm secured to the ejector and detachably engaging the last-named jaw.

9. A butter-mold comprising pivoted jaws, a mold carried by one of the jaws, a presser-block carried by the other jaw, and means connected to the ejector and detachably engaging the last-named jaw whereby the ejector is actuated by the spreading of the jaws.

In testimony whereof I affix my signature in presence of two witnesses.

FREDERICK ADOLPH WEGNER.

Witnesses:
GLENN L. GILBERT,
C. E. SMITH.